(No Model.)
H. T. YARYAN.
MANUFACTURE OF LINSEED AND OTHER OILS.
No. 312,418. Patented Feb. 17, 1885.
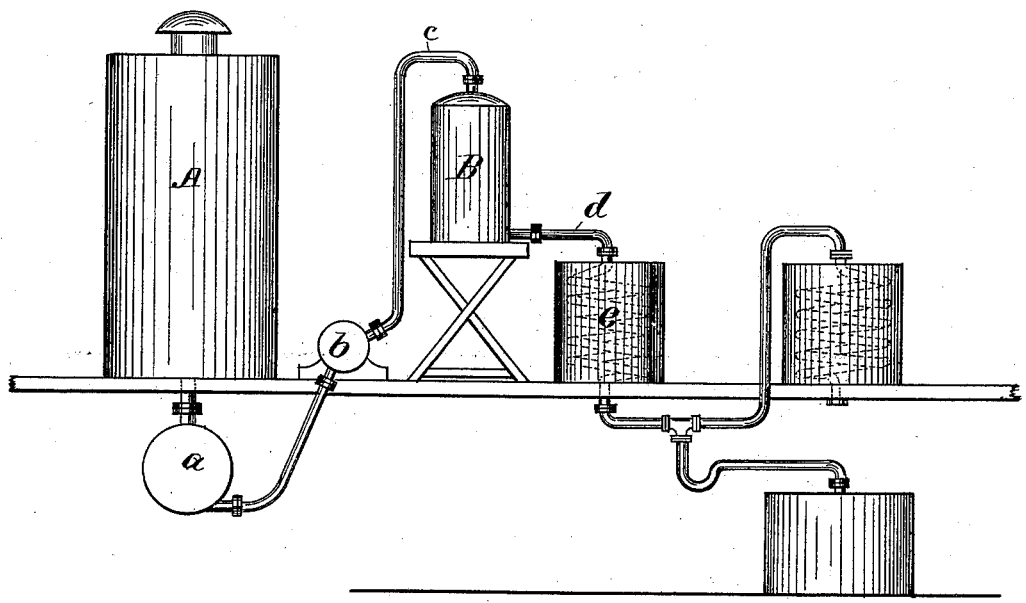
Witnesses:
Ed. J. Walker
Gomer Jones
Inventor:
Homer T. Yaryan
By L. M. Hosea
Atty

UNITED STATES PATENT OFFICE.

HOMER T. YARYAN, OF TOLEDO, OHIO.

MANUFACTURE OF LINSEED AND OTHER OILS.

SPECIFICATION forming part of Letters Patent No. 312,418, dated February 17, 1885.

Application filed February 7, 1883. (No model.)

*To all whom it may concern:*

Be it known that I, HOMER T. YARYAN, a citizen of the United States, residing at Toledo, Lucas county, Ohio, have invented new and useful Improvements in Manufacture of Linseed and other Oils, of which the following is a specification.

My invention relates to the manufacture of linseed and other oils, having more particular reference to a method of purifying the same from coloring and odorizing matters by filtration while in cold solution with a hydrocarbon or other solvent, said invention being usefully applied in connection with the method of extracting oils by the solvent process described by me in Letters Patent No. 205,516, issued to me July 2, 1878, as hereinafter more fully set forth. In practically operating the said process with vegetable oils—such as linseed and cotton-seed oils—it is found that the oil acquires a disagreeable odor, and also that the application of heat in separating and driving off the solvent employed tends to deepen and to fix the color; and, further, that the process of aeration as at first employed tends to oxidize the oil unless great care is used, thereby rendering it less valuable for certain uses.

My present invention is intended to remedy these objections; and it consists in a clarifying and purifying process, preferably introduced as an intermediate step in the manufacture while the oil is still held in cold solution by the liquid solvent and before the application of heat for its removal, the oil being at this stage of the manufacture in the proper condition for purification by filtration, with great convenience and with but little additional expense.

In carrying out my improvement I employ, preferably, animal charcoal in a closed vessel or tank, through which the mixed oil and solvent is passed as it comes from the "percolators" or tanks wherein the meal is first treated with solvent, no particular form of apparatus being required, except a closed tank containing the charcoal, into which the mixed oil product is delivered at the top and allowed to flow out at the bottom after filtration through the solid contents of the tank. In its passage by filtration through the charcoal much of the extraneous coloring-matter and other deleterious matters are removed from the oil, so that upon subsequently volatilizing and driving off the solvent the oil is obtained in an exceedingly pure condition, and thus rendered much more valuable. By this improvement, also, the expensive distillation and resolution of the finished oil required in bleaching is entirely avoided and a better article produced.

In the accompanying drawing the apparatus required in carrying out my improvement is illustrated, the parts hereinafter referred to being indicated by the letters of reference.

In the apparatus illustrated, A designates the "percolator," in which the meal is treated with the liquid solvent, and B the filtering-tank. The percolator having received its charge of meal, the solvent is introduced at the top and allowed to flow downward through the meal, escaping into a suitable collecting-tank, a, below. From thence the liquid solution is delivered, by pumps b or otherwise, into the filtering-tank B at the top by the pipe C, and allowed to percolate downward through its charge of animal charcoal, whence it is taken off through the pipe d and delivered to the vaporizing-coil e, where the solvent is driven off and subsequently recovered by condensation and the oil also collected. After exhausting the decolorizing-power of the charcoal, the pipes c and d are disconnected and the charcoal treated with pure solvent to wash out the traces of oil, and then with steam to vaporize and drive off the remaining solvent—both oil and solvent being recovered by vaporization and recondensation—forms of apparatus for this purpose being fully shown and described in my said former patents, and therefore being no part of my present invention. By this process the charcoal is kept in good condition for reburning, and its filtering capacity may be many times renewed, and the cost of refining the oil thus reduced to a minimum.

I do not in my present invention confine myself to any particular form of apparatus for extracting the oil by solution, nor to any special forms of apparatus for vaporizing and recovering the solvent employed. Neither do I claim as new the method of bleaching or purifying oils with animal charcoal, broadly considered, except in so far as the method is employed with oils in cold solution in contradistinction to that in which artificial heat is applied to the oil solution, or to the filtering material or vessels, or both.

It is obvious that the same beneficial result will be attained by dissolving oil produced by expression or otherwise in a solvent and treating the mixture as before described; but the most important use of my invention is in connection with the solvent process of extraction, as before stated.

I claim as new and desire to secure by Letters Patent—

1. The described process of purifying oils, consisting in dissolving the same in a solvent and passing the solution while cold through a filter without the application of artificial heat, substantially as set forth.

2. The improvement in the manufacture of oils, consisting in extracting the oil by solution from the oil-bearing substances, and while in solution, and without the application of artificial heat, passing the solution through animal charcoal for the purpose of bleaching and deodorizing the oil, and afterward removing the solvent, substantially as set forth.

In testimony whereof I have hereunto set my hand in the presence of two subscribing witnesses.

HOMER T. YARYAN.

Witnesses:
O. A. FORBES,
F. B. DODGE.